March 8, 1960 W. A. BARNES 2,927,487
DIE CONTROL FOR COLD PRESSURE WELDING
Filed Jan. 28, 1959 3 Sheets-Sheet 1

INVENTOR.
WILLIAM A. BARNES
BY Pyle & Fisher
ATTORNEYS

March 8, 1960  W. A. BARNES  2,927,487
DIE CONTROL FOR COLD PRESSURE WELDING
Filed Jan. 28, 1959                               3 Sheets-Sheet 2

INVENTOR.
WILLIAM A. BARNES
BY
Pyle & Fisher
ATTORNEYS

United States Patent Office 2,927,487
Patented Mar. 8, 1960

2,927,487

DIE CONTROL FOR COLD PRESSURE WELDING

William A. Barnes, Utica, N.Y., assignor to
Kelsey-Hayes Company

Application January 28, 1959, Serial No. 789,668

1 Claim. (Cl. 78—82)

This invention relates in general to gripping and forming apparatus intended for cold pressure welding, and relates more specifically to mechanism for controlling the closing action of split die sections upon a workpiece, and to the control of movement of the closed split die toward another die with a pressure weld action.

Apparatus for manual pressure welding, wherein die carriage are driven toward one another by manipulation of handle grip members, have now become well known by the pressure welding industry. Such devices require the workpieces to be individually loaded and secured in opposed split die members, and each workpiece is prepared and trimmed while held in its die, to a specific projection from the face of the die. Thereafter the dies are driven together by a manual operation of the handle members to cause the unique lateral flow now known to be the true characteristic of cold pressure welding.

Although such manual operation is highly successful, and is still very useful for its intended purpose and probably will always be so, there is need for production welding at a faster rate, and there is need for welding pieces beyond the power capacity of a human operator. Larger size workpieces are difficult to set tightly into a split die holder under the limitations of presently known manual operation.

Therefore, a broad object of the present invention is to provide opposed split dies adapted first to each close upon separate workpieces and thereafter closed toward one another to drive the workpieces together.

A more specific object of the present invention is to provide improved die space adjustment devices capable of determining the distance between dies at the beginning of a work cycle in order to eliminate the need for trimming of the workpieces to length with respect to the die faces.

Another object of this invention, therefore, is to provide opposed dies reciprocable toward and away from one another, with stop pins determining the maximum separation distance, wherein the stop pins are axially shiftable and have contact surfaces which are adjustable along the die movement path by reason of such axial shiftability.

This application is a continuation-in-part of application for Letters Patent, Serial No. 669,540, filed July 2, 1957, for "Die Movement Control for Cold Pressure Welding."

Other objects and a fuller understanding of the invention may be had by referring to the following description and claims, taken in conjunction with the accompanying drawings in which:

Figure 1:
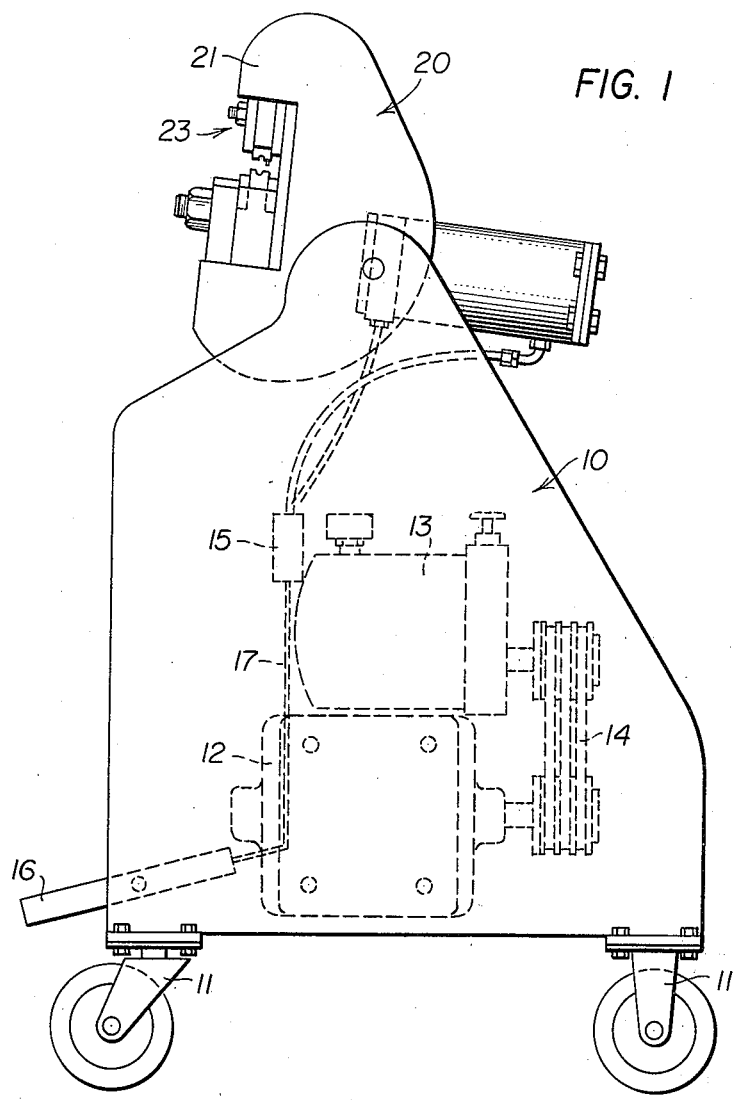
Figure 1 is a general illustration in side elevation of a portable press welder embodying a cam driven carriage actuator, and adapted to embody the principles of this invention.

A portable model of a welding machine, which has embodied therein the fundamental features of this invention, is set forth in Figure 1 of the drawings. This model is carried and operated by mechanism contained within a tote housing 10 made portable by casters 11.

A fluid power system is housed within the tote housing 10. A motor 12 and hydraulic pump 13 are drawn in dotted outline. A belt system 14 interconnects the two for power transmission. A four-way valve 15 is controlled by the operator of the device through a foot treadle 16 operating a control link 17.

Improved cold pressure welding dies and controls for such dies according to this invention are carried in a head assembly 20. The assembly 20 is essentially a small press embodied in a C frame 21.

This particular embodiment of the invention has been developed principally for the cold pressure welding of metals. It has been found that some metals, aluminum and copper in particular, can be united with an exceptionally strong weld without the use of heat or foreign substances. Such welding is accomplished by gripping the workpieces tightly and forcing them together under strictly controlled conditions. These conditions, metallurgically, are now fully disclosed, in both literature and issued patents, and is well understood by metallurgists skilled in this art.

The inventors of the parent case of which this case is a continuation-in-part recognized certain basic concepts of spacing dies to avoid the necessity of interruption of the weld process after a workpiece has been gripped by a pair of split dies. This invention provided an improved means of adjusting the gap between such dies in order to compensate for errors of die manufacture or wear in the dies.

Figure 2:
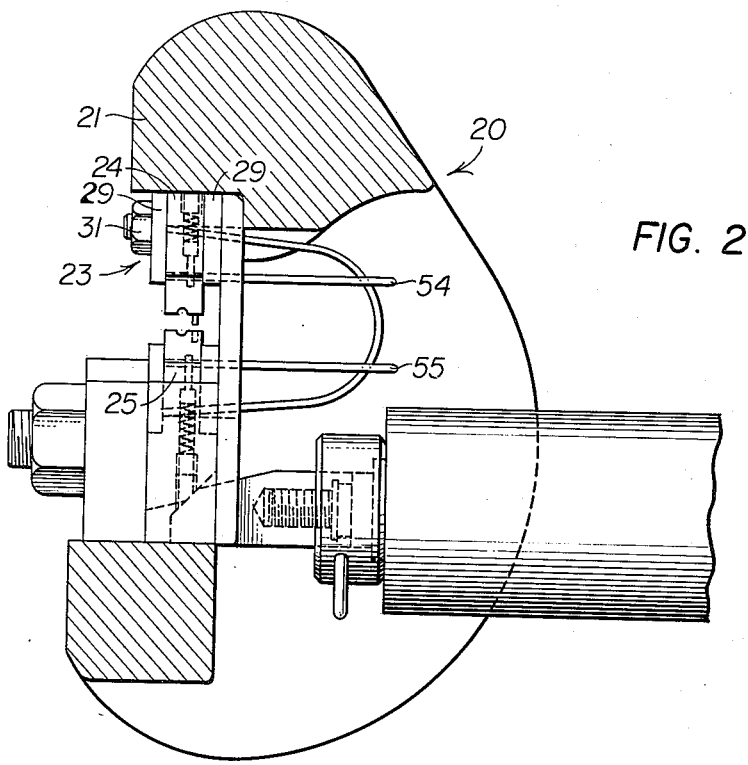
Figure 2 is a side elevation, enlarged with respect to Figure 1, of the C-shaped press portion of the device shown in Figure 1, and illustrating in more detail the fundamental concept of die spacing devices and die retaining devices.
Figure 3:
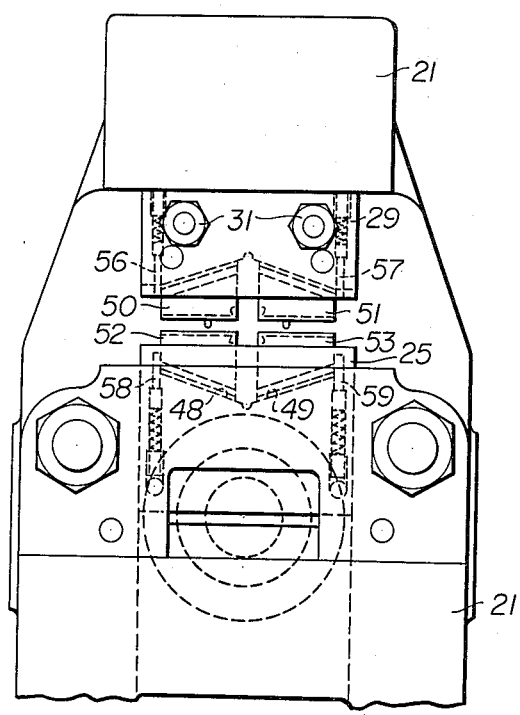
Figure 3 is a front view of the head shown in Figure 1.

For a full understanding of the present invention, reference is made to the Figures 1 through 3. In these illustrations, a stationary die carriage 23 is carried at the upper mouth portion of the C-shaped frame 21. This die carriage 23 is preferably a composite structure embodying a center block 24 sandwiched between side rails 29 and held in the illustrated position by a clamping bolt 31. Figure 3 best illustrates inwardly sloping slide surfaces in an inverted V relationship. These inwardly sloping slide surfaces are utilized as closing cams upon which die halves 50 and 51 may ride. It will be seen that an upward force upon dies 50 and 51 will cause a closing cam action forcing these die halves toward one another. Side rails 29, in conjunction with the center block 24, provide a guide slot to direct the dies 50 and 51 in movement toward and away from one another.

A bottom die carriage 25 of similar construction provides sloping surfaces 48 and 49 in a V relationship to act as closing cams. Die halves 52 and 53 are designed to ride these surfaces and close with respect to one another under vertical forces.

In the embodiment of the invention shown in the first three figures of the drawings, the dies are held in tight contact with their cam surfaces, and resistance to closing of the dies is provided by hair springs 54 and 55.

In a uniting of workpieces, such for example as wire, by cold pressure butt welding, the workpieces are held by dies and forced tightly against one another in such a manner that the workpieces are caused to laterally in surface contact under extreme pressure and under confinement. The principles of cold pressure welding have been well developed. One of the principles which has evolved is that the amount of material available to flow during the welding process is very critical. Too much material will prevent complete closing of the dies and too little will prevent complete filling of the die cavity. Either event will produce less than satisfactory results. Since the time of the original basic concept of this invention, applicants have discovered through further research that the multiple stage welding action as suggested in the parent application, Serial No. 669,540 can, in some instances at least, eliminate the requirement for exact spacing of workpieces with respect to holding dies. Nevertheless, there are many instances where excess material cannot be tolerated and in all instances better results are obtained if an over-abundance of excess material is not achieved. Furthermore, a weld cannot be achieved at all if the material does not project sufficiently from the dies to have material for welding regardless of whether the over-projection is critical or not. Hence, this invention is entirely useful regardless of these later developments.

Prior to this invention, the control of the amount of material between the two mated split dies has been achieved by preparing and trimming the workpiece with respect to the face of the die after the workpiece has been clamped in the die, as shown in Barnes patent, Serial No. 2,779,954. It has been discovered that two dies can be placed in the machine of this invention with the die faces spaced a precise distance with respect to one another in order to eliminate preparation devices. Workpieces may then be positioned in the dies with their ends in touching relationship. Then, because the dies are properly spaced originally, the amount of material within the dies will be within acceptable range limitation permitting a uniform weld. The ends must be clean and relatively square, but need not be spaced to the die face as before. Furthermore, as suggested above, there are instances in certain developments now discovered that do not even require the ends to be cleaned and relatively square. Nevertheless, clean good results are enhanced by the accurate spacing of the dies according to the concepts of this invention.

Because the amount of material between the dies will vary according to the size and shape of a particular workpiece, the spacing between dies for various workpiece sites will be different. According to this invention, stop pins 56, 57, 58, and 59, as best illustrated in Figure 3, are employed as back stops to limit the spacing of the dies. Then, the actual die length can be accurately calculated to allow just the correct amount of space between the die faces.

Even the most accurate calculations and the most accurate machine work cannot be counted upon to produce absolutely perfect spacing between die faces which will remain perfect under operating conditions. Furthermore, some workpieces, particularly when the workpieces are drawn wire, will vary in size from piece to piece or from batch to batch of the workpiece material, and hence some adjustment of the space between the dies is desirable, and often essential, for good results. Accordingly, reference to Figure 4 will reveal an improved die spacing mechanism carrying the basic principles of die spacing forward in an improved manner.

Figure 4:
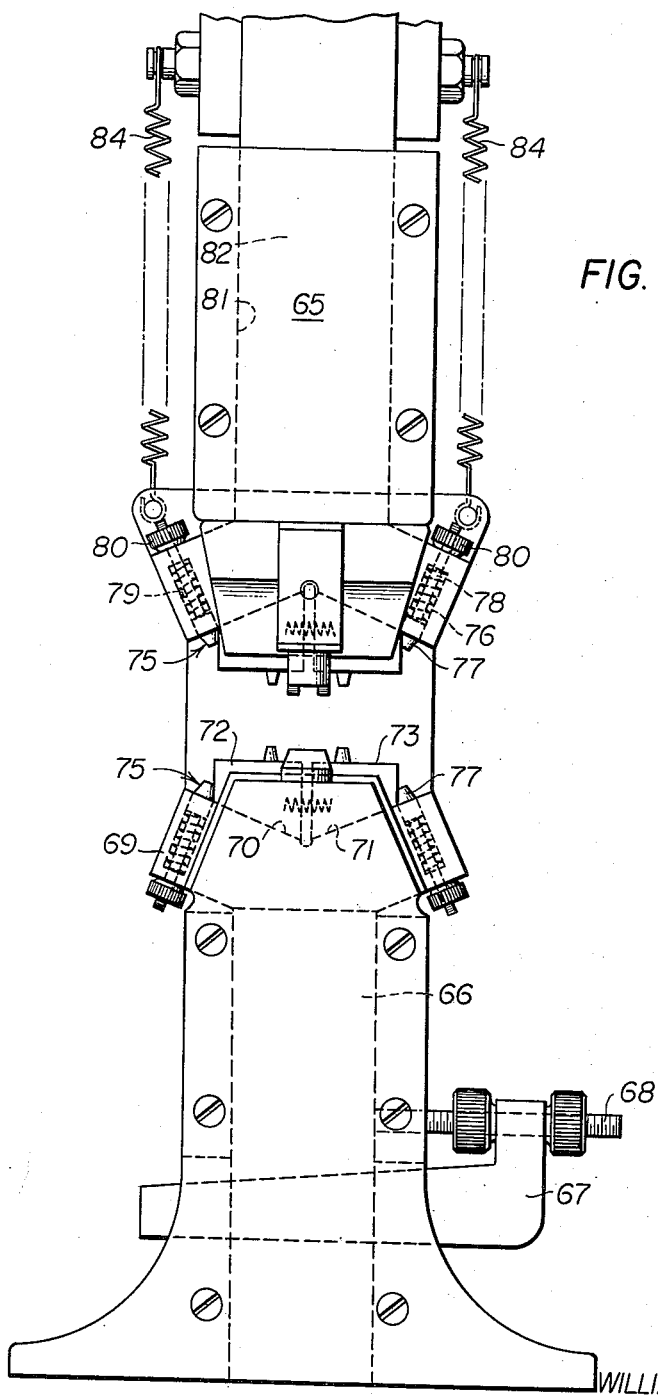
Figure 4 is a front view of a press device embodying relatively closable carriage devices and embodying improved die spacing apparatus as an illustration of an adjustable modification of the die spacing portion of this invention.

Figure 4 illustrates the improved adjustable die stop pin device of this invention, as set forth in the environment of an improved press device. The function of the improved press device shown in Figure 4, insofar as cold pressure welding is concerned, is not substantially different from that shown in Figures 1 through 3. This press of Figure 4 has a base die bed 65 with an adjustable bed 66. A taper wedge 67 provides a degree of vertical adjustment. An adjustment device 68 is provided to accurately determine the position of the wedge 67 and thereby accurately determine the vertical adjustment of the bed 66.

This particular press device is top actuated. A guide 81 is provided to guide a ram 82 which in turn is driven through a fixed reciprocal work path cycle by a hydraulic power unit 83. Springs 84 may be provided to return the ram 82 if a conventional one-direction piston and cylinder unit is employed. Generally such piston and cylinder devices, unless elaborately equipped, have a fixed travel. Hence, the adjustment of the adjustable bed 66 becomes a desirable feature.

The bed 66 has a V head 69 providing inwardly sloping cam surfaces 70 and 71 substantially identical to the corresponding cam surfaces set forth in Figure 1. Likewise die members 72 and 73 are laterally shiftable along such die surfaces by means of lateral force components generated through the cam surfaces.

In Figure 2 the stop pins 56 through 59 were described as being the stop pins which determined the maximum die separation. In this embodiment of the invention adjustable die stop pins 75 are provided. These adjustable stop pins 75 are conveniently constructed of a central pin member 76 having a frusto-conical head 77. A bore 79 provides an operating housing. A spring 78 within the housing surrounding the pin 76 abuts the head 77 and urges the conical head 77 out of the bore 79. The rear part of the pin 76 is threaded and provided with an adjustment lock nut 80. Accordingly, rotation of the lock nut 80 will determine the forward projection of the conical head 77. Examination of the Figure 4 will reveal that the conical side walls of the head 77 are positioned at such an angle that they will always extend in a parallel position with respect to the back wall of the co-operating die. Hence, the conical head may be adjusted forward or backward in order to present an infinitely adjustable back-stop against which the die may come to rest. Hence, minor variations in workpiece size and in the condition of the dies may be compensated by the adjustable nature of this improved stop pin device.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A composite jaw, adapted in connection with a supporting member with a pair of adjoining angularly disposed cam surfaces to form a part of a machine for cold pressure welding of workpieces, and comprising a pair of side by side die sections movable to and from one another, provided with cam surfaces in sliding engagement with the cam surfaces of the supporting member respectively, stop means at the rear of each die, each stop means being a pin having a conical end, track means establishing said pin for longitudinal adjustment along a path wherein the conical wall of the end is adjustable throughout a range along the path of reciprocation of the associated die, and means for adjusting the pin along its path.

References Cited in the file of this patent

UNITED STATES PATENTS

| 1,331,227 | Barnes et al. | Feb. 17, 1920 |
| 1,867,288 | Thomas | July 12, 1932 |
| 2,357,204 | Joyner | Aug. 29, 1944 |
| 2,863,344 | Barnes | Dec. 9, 1958 |